Patented Aug. 22, 1950

2,520,100

UNITED STATES PATENT OFFICE 2,520,100

TETRACHLOROPHTHALIC ACID AND ANHYDRIDE CURING OF AMINOPLASTS

Edwin Fiske Morfit, South River, N. J., assignor to American Cyanamid Company, New York, N. Y., a corporation of Maine No Drawing. Application June 14, 1948, Serial No. 32,981

5 Claims. (Cl. 260—67.6)

This invention relates to rapid-curing, thermosetting resinous compositions. More particularly, the invention relates to rapid-curing molding compositions comprising a thermosetting aminoplast selected from the group consisting of urea-formaldehyde and melamine-formaldehyde resins having incorporated therein tetrachlorophthalic anhydride.

Thermosetting aminoplastic resins of the class described have a community of properties which make them particularly applicable for many uses. There are some utilities, however, in which a composition containing a latent catalyst is essential, and it is essential that the latent catalyst be effective at slightly elevated temperatures, to rapidly cure the resinous composition. A particular operation, i. e., molding by automatic molding machines, requires a catalyst which is latent at normal temperatures, but an extremely active catalyst at slightly elevated temperatures. It was to fulfill this need that the compositions forming the basis for this application were first discovered.

In order to meet these requirements of a catalyst inactive at normal temperatures and high catalytic activity at slightly elevated temperatures, it was found that the standard urea-formaldehyde and melamine-formaldehyde molding resinous compositions containing from about 0.05% to 0.5% of tetrachlorophthalic anhydride or the acid thereof, based on the weight of resin, gives a composition in conjunction with an inhibitor such as hexamethylene tetramine which has excellent storage characteristics, but which, upon the application of heat, rapidly cures to give hard molded articles. In fact, wherein all other properties are substantially the same, materials containing this latent catalyst permit an increase in the speed of molding of from 20%–300%, depending upon the shape and type of article to be molded, equipment used, and the like. From a viewpoint of optimum efficiency of operation, and an optimum control of process, it has been found that compositions of the class described containing from about .25% to about .45% tetrachlorophthalic anhydride, based on the weight of resin are the most satisfactory.

The tetrachlorophthalic anhydride may be used per se as a finely subdivided solid particle, or it may be employed as a mix with other materials to effect greater dispersion thereof, which materials may or may not be latent catalysts, such as paratoluene sulfonamide, or straight lubricants, such as zinc stearate or, for that matter, a small portion of the molding resin may be employed as a dispersant for the catalyst alone or in conjunction with the other types of materials previously listed.

In order to more fully describe the invention, the following examples are given by way of illustration:

Example 1

A master batch of catalyst was prepared by ball milling a mixture of 50 parts of a 35% alpha-cellulose filled dry urea-formaldehyde resin, 75 parts of para-toluene sulfonamide, 145 parts of tetrachlorophthalic anhydride and 0.2 parts of zinc stearate. The resulting smooth, uniform powder obtained in this manner was then used in varying proportions as catalysts for molding compositions as follows:

A

To 3000 parts of a 35% alpha cellulose filled dry urea-formaldehyde resin, there was added 12 parts of the master batch latent catalyst described in Example 1 above, eight parts of hexamethylenetetramine and 12 parts of zinc stearate. This mix was ball milled to effect complete uniformity of dispersion, after which the composition was molded at 335° F. for 6 seconds at 2000 p. s. i. to yield buttons having excellent appearance and durability, indicating complete and proper cure.

B

To 3000 parts of a 35% alpha cellulose filled dry urea-formaldehyde resin there was added 14 parts of the master batch latent catalyst described in Example 1 above, 8 parts of hexamethylenetetramine and 12 parts of zinc stearate. This mix was ball milled to effect complete uniformity of dispersion, after which the composition was molded in automatic equipment at 325° F. for 15 seconds at 3000 p. s. i. to yield buttons having excellent appearance and durability, indicating complete and proper cure.

C

To 3000 parts of a 35% alpha cellulose filled dry urea-formaldehyde resin there was added 13 parts of the master batch latent catalyst described in Example 1 above, 8 parts of hexamethylenetetramine and 12 parts of zinc stearate. This mix was ball milled to effect complete uniformity of dispersion, after which the composition was molded at 300° F. for 50 seconds at 3000 p. s. i. to yield watch boxes having excellent appearance and durability, indicating complete and proper cure.

D

To 3000 parts of a 35% alpha cellulose filled dry urea-formaldehyde resin there was added 15 parts of the master batch latent catalyst described in Example 1 above, eight parts of hexamethylenetetramine and 12 parts of zinc stearate. This mix was ball milled to effect complete uniformity of dispersion, after which the composition was molded at 325° F. for 7 seconds at 2000 p. s. i. to yield buttons having excellent appearance and durability, indicating complete and proper cure.

To 3000 parts of a 35% alpha cellulose filled dry urea-formaldehyde resin there was added 16 parts of the master batch latent catalyst described in Example 1 above, 8 parts of hexamethylenetetramine and 12 parts of zinc stearate. This mix was ball milled to effect complete uniformity of dispersion, after which the composition was molded at 290° F. for 48 seconds at 4000 p. s. i. to yield radio cabinets having excellent appearance and durability, indicating complete and proper cure.

F

To 3000 parts of a 35% alpha cellulose filled dry urea-formaldehyde resin there was added 5 parts of the master batch latent catalyst described in Example 1 above, 7 parts of hexamethylenetetramine and 12 parts of zinc stearate. This mix was ball milled to effect complete uniformity of dispersion, after which the composition was molded at 315° F. for 90 seconds at 3500 p. s. i. to yield radio cabinets having excellent appearance and durability, indicating complete and proper cure.

G

To 3000 parts of a 35% alpha cellulose filled tray dried urea-formaldehyde resin there was added 9 parts of the master batch latent catalyst described in Example 1 above, 7 parts of hexamethylenetetramine and 6 parts of zinc stearate. This mix was ball milled to effect complete uniformity of dispersion, after which the composition was molded at 300° F. for 50 seconds at 3000 p. s. i. to yield watch boxes having excellent appearance and durability, indicating complete and proper cure.

H

To 3000 parts of a 35% alpha cellulose filled dry urea-formaldehyde resin there was added 21 parts of the master batch latent catalyst described in Example 1 above, 8 parts of hexamethylenetetramine and 12 parts of zinc stearate. This mix was ball milled to effect complete uniformity of dispersion, after which the composition was molded in automatic equipment at 290° F. for 6 seconds at 2000 p. s. i. to yield buttons having excellent appearance and durability, indicating complete and proper cure.

EXAMPLE 2

Other master batches were prepared by ball milling for approximately 24 hours, the following compositions:

A

To 463 parts of an urea-formaldehyde resin having a mol ratio of about 1:1.7, which had been heat-treated to give a very stiff flow, or, stated differently, which had been highly condensed, but which was still fusible, there was added 694 parts of para-toluene sulfonamide and 1,342 parts of tetrachlorophthalic anhydride and 2 parts of zinc stearate.

B

To 925 parts of a spray dried urea-formaldehyde resin having a mol ratio of about 1:1.5, which had been heat-treated to give a very stiff flow, or, stated differently, which had been highly condensed, but which was still fusible, there was added 1387 parts of para-toluene sulfonamide and 2683 parts of tetrachlorophthalic anhydride and 4 parts of zinc stearate.

C

To 573 parts of a dry urea-formaldehyde resin of very stiff flow, there were added 859 parts of para-toluene sulfonamide, 1662 parts of tetrachlorophthalic anhydride and 2.5 parts of zinc stearate.

The above master batch compositions were used in amounts varying from 4.5 parts to 15 parts per 3000 parts of urea-formaldehyde resin, with 7 to 8 parts of hexamethylenetetramine and 12 parts zinc stearate, according to the teachings of the above Example 1 (A–H), to give comparable results.

The following examples illustrate the utility of the tetrachlorophthalic anhydride per se, without the employment of dispersants or other materials such as lubricants and other catalysts.

EXAMPLE 3

Molding compositions employing finely subdivided tetrachlorophthalic anhydride alone were prepared and molded as follows:

A

To 3,000 parts of a 35% alpha cellulose filled urea-formaldehyde resin there was added 1.5 parts of finely subdivided tetrachlorophthalic anhydride, 7 parts of hexamethylenetetramine and 12 parts of zinc stearate. This mixture was milled until a uniform solid dispersion was obtained. The composition was then molded at 335° F. for 2 minutes at 4000 p. s. i. to yield radio cabinets.

B

To 3,000 parts of a 35% alpha cellulose filled urea-formaldehyde resin there was added 8 parts of finely subdivided tetrachlorophthalic anhydride, 8 parts of hexamethylenetetramine and 12 parts of zinc stearate. This mixture was milled until a uniform solid dispersion was obtained. The composition was then molded in automatic equipment at 325° F. for 6 seconds at 2000 p. s. i. to yield buttons.

C

To 3000 parts of a 35% alpha cellulose filled urea-formaldehyde resin there was added 2 parts of finely subdivided tetrachlorophthalic anhydride, 7 parts of hexamethylenetetramine and 12 parts of zinc stearate. This mixture was milled until a uniform solid dispersion was obtained. The composition was then molded at 315° F. for 1½ minutes at 3500 p. s. i. to yield radio cabinets.

D

To 3000 parts of a 35% alpha cellulose filled urea-formaldehyde resin there was added 7 parts of finely subdivided tetrachlorophthalic anhydride, 7 parts of hexamethylenetetramine and 12 parts of zinc stearate. This mixture was milled until a uniform solid dispersion was obtained. The composition was then molded at 325° F. for 18 seconds at 2000 p. s. i. to yield buttons.

E

To 3000 parts of a 35% alpha cellulose filled urea-formaldehyde resin there was added 9 parts of finely subdivided tetrachlorophthalic anhydride, 8 parts of hexamethylenetetramine and 12 parts of zinc stearate. This mixture was milled until a uniform solid dispersion was obtained. The composition was then molded at 325° F. for 8 seconds at 2000 p. s. i. to yield buttons.

F

To 3000 parts of a 35% alpha cellulose filled urea-formaldehyde resin there was added 10.5 parts of finely subdivided tetrachlorophthalic anhydride, 8 parts of hexamethylenetetramine and 12 parts of zinc stearate. This mixture was milled until a uniform solid dispersion was obtained. The composition was then molded at 330° F. for 6 seconds at 2000 p. s. i. to yield buttons.

G

To 3000 parts of a 35% alpha cellulose filled urea-formaldehyde resin there was added 9 parts of finely subdivided tetrachlorophthalic anhydride; 8 parts of hexamethylenetetramine and 6 parts of zinc stearate were then added at the beginning of mixing and 3 parts at the end thereof. This mixture was milled until a uniform solid dispersion was obtained. The composition was then molded in automatic equipment at 290° F. for 25 seconds at 3000 p. s. i. to yield closures.

H

To 3000 parts of a 35% alpha cellulose filled urea-formaldehyde resin there was added 8 parts of finely subdivided tetrachlorophthalic anhydride. Eight (8) parts of hexamethylenetetramine and 6 parts of zinc stearate were added at the beginning of the mixing and 6 parts were added at the end thereof. This mixture was milled until a uniform solid dispersion was obtained. The composition was then molded at 325° F. for 8 seconds at 2000 p. s. i. to yield buttons.

I

To 3000 parts of a 35% alpha cellulose filled urea-formaldehyde resin there was added 10.5 parts of finely subdivided tetrachlorophthalic anhydride. Eight (8) parts of hexamethylenetetramine and 6 parts of zinc stearate were added at the beginning of the mixing and 6 parts were added at the end thereof. This mixture was milled until a uniform solid dispersion was obtained. The composition was then molded at 335° F. for 6 seconds at 2000 p. s. i. to yield buttons.

J

To 3000 parts of a 35% alpha cellulose filled urea-formaldehyde resin there was added 9 parts of finely subdivided tetrachlorophthalic anhydride. Eight (8) parts of hexamethylenetetramine and 6 parts of zinc stearate were added at the beginning of the mixing and 6 parts were added at the end thereof. This mixture was milled until a uniform solid dispersion was obtained. The composition was then molded at 325° F. for 7 seconds at 2000 p. s. i. to yield buttons.

Colored molded articles were prepared by incorporating a small amount of pigment into the composition at any point of the process, prior to molding, either in the production of the resin, in a master batch catalyst, or in the mixing of the uniform dispersion of the resin and catalyst. From a simplified production viewpoint, it is preferable to employ this latter process, i. e., uniformly disperse the resin, pigment, catalyst, stabilizer, and lubricant.

In order to illustrate this feature, the following examples are given by way of illustration.

EXAMPLE 4

Pigmented molding compositions were prepared and molded as follows:

A

An urea-formaldehyde resin having 35% alpha cellulose filler based on the weight of resin and filler therein, was blanded with 0.45% of the master batch catayst of Example 1, .26% hexamethylenetetramine, 0.5% zinc stearate, and 0.1% of commercial non-ferrous pink pigment, said percents being based on the weight of filled resin. The materials were ball milled until a uniform dispersion was obtained, which dispersion was then molded at 325° C. for 6 seconds at 2000 p. s. i. to give pink colored molded articles.

The above example was repeated, varying the percent of master batch catalyst to .55% and .7% catalyst, and comparable results were obtained. These examples were repeated employing other pigments, for example, white molded articles obtained with compositions employing 0.05%–0.2% non-ferrous white pigments, blue articles were obtained by employing 0.2% of non-ferrous blue pigment, and ivory articles were obtained by employing 0.1% of non-ferrous ivory pigment. In all cases the pigments were standard commercial blends of non-ferrous material, since ferrous materials tend to produce discoloration in the molded articles. The light shaded articles require a lesser quantity of pigment than the darker shaded articles, as might be expected. Accordingly, the pigment may vary from 0.03 to 0.3%, based on the weight of resins.

Although the invention has been described hereinabove with respect to molding urea-formaldehyde resins, the invention is not so limited. Any of the urea-formaldehyde resins, filled and unfilled, suitable for molding compositions, may be used in practicing this invention, and these resins having a mol ratio of 1.1 to 2.5 mols of formaldehyde per mol of urea, are particularly well suited and adapted to practicing this invention in the molding compositions, and any of the acid-curable urea-formaldehyde resins or compositions containing these urea-formaldehyde resins, such as adhesive, laminating and coating resins, are also suitable for practicing this invention, wherein latent or acid catalysts are employed.

In addition to the urea-formaldehyde resins, the melamine-formaldehyde resins, filled and unfilled, are also well suited for practicing the teachings of this invention hereinabove described. In molding art, the melamine resins having 1.5–3.5 mols of formaldehyde per mol of melamine are most suitable. However, any of the melamine-formaldehyde resins may be used in practicing this invention, in the particular art wherein the particular resin is adapted. It should be borne in mind, however, that the melamine-formaldehyde resins, for the most part, do not need catalysts to effect the resin cure. However, the latent catalysts of this invention, as described hereinabove, used alone or in conjunction with dispersants or other materials, reduce the cure period at any particular temperature, and it is for this purpose that the catalysts are employed.

In order to maintain a fully stable composition when the tetra-chlorophthalic anhydride or the acid thereof is dispersed and blended, either alone or in conjunction with dispersants or other acidic catalysts in the particular thermosetting aminoplastic resin, it is essential that an inhibitor such as hexamethylenetetramine be employed therewith, in order to retain the relative stability of the composition. The preferred theory is that the hexamethylenetetramine ties up the acidic catalyst in the form of a salt which decomposes at elevated temperatures, releasing the acid. Applicant is not aware of the true chemical reactions involved, but is aware of the observation that the hexamethylenetetramine does effect the stability of the particular compositions of catalyst with the thermoplast at normal temperatures, and does not retard but accelerates the rate of cure at elevated temperatures. The amount of hexamethylenetetramine employed is not particularly critical, it being essential, however, that a minimum amount of approximately 0.10% based on the weight of resin be employed, and, preferably, between .25 and .45% of hexamethylenetetramine be used. Any amount above .5% serves no useful purpose. When compositions are catalyzed relatively soon before use, such that storage stability is not important, the inhibitor, hexamethylenetetramine, need not be used.

The examples employed hereinabove and described in the invention, all include a lubricant such as zinc stearate. This particular lubricant is by no means necessary, as other lubricants may be employed, such as calcium stearate and the like. It should be borne in mind, however, that the lubricant is added wholly by way of convenience, and does not control the invention, nor is the invention controlled thereby, as satisfactory results are obtained in the absence thereof.

As previously stated, the thermosetting resins may be unfilled or filled. Suitable fillers are: alpha cellulose, wood flour, asbestos fibres, glass fibres, threads and woven cloth.

The resinous compositions may be modified with other agents, such as opacifiers, colorants and resinous bodies such as alkyd resins, adducts, etc. A particular agent, unsaturated polyester alkyd resins, may be conveniently employed with the thermosetting aminoplasts and catalyst, in providing excellent surface finishing compositions.

I claim:

1. A molding composition being stable at normal temperatures and capable of rapidly curing to an infusible state at elevated temperatures comprising a thermosetting aminoplast selected from the group consisting of urea-formaldehyde resins and melamine-formaldehyde resins and tetrachlorophthalic anhydride present in an amount from about 0.05% to about 0.5% based on the weight of resin, and hexamethylenetetramine present in an amount from about 0.1% to about 0.5% based on the weight of resin.

2. A molding composition being stable at normal temperatures and capable of rapidly curing to an infusible state at elevated temperatures comprising a thermosetting aminoplast selected from the group consisting of urea-formaldehyde resins and melamine-formaldehyde resins and tetrachlorophthalic anhydride present in an amount from about .25% to about .45% based on the weight of said resin, and hexamethylenetetramine present in an amount from about 0.25% to about 0.45% based on the weight of resin.

3. A molding composition being stable at normal temperatures and capable of rapidly curing to an infusible state at elevated temperatures comprising a urea-formaldehyde resin having a mol ratio of 1.1 to 2.5 mols of formaldehyde per mol of urea and tetrachlorophthalic anhydride present in an amount from about 0.05% to about 0.5% based on the weight of resin, and hexamethylenetetramine present in an amount from about 0.1% to about 0.5% based on the weight of resin.

4. A molding composition being stable at normal temperatures and capable of rapidly curing to an infusible state at elevated temperatures comprising a melamine-formaldehyde resin having a mol ratio of about 1.5 to 3.5 mols of formaldehyde per mol of melamine and tetrachlorophthalic anhydride present in an amount from about 0.05% to about 0.5% based on the weight of resin, and hexamethylenetetramine present in an amount from about 0.1% to about 0.5% based on the weight of resin.

5. A molding composition being stable at normal temperatures and capable of rapidly curing to an infusible state at elevated temperatures comprising an aminoplast selected from the group consisting of urea-formaldehyde resin and melamine-formaldehyde resin and an acidic catalyst selected from the group consisting of tetrachlorophthalic anhydride and the acid thereof, said catalyst being present in an amount from about 0.05% to about 0.5% based on the weight of resin, and hexamethylenetetramine present in an amount from about 0.1% to about 0.5% based on the weight of resin.

EDWIN FISKE MORFIT.

REFERENCES CITED

The following references are of record in the file of this patent:

UNITED STATES PATENTS

| Number | Name | Date |
|---|---|---|
| 2,056,462 | Howald | Oct. 6, 1936 |
| 2,192,129 | Ellis | Feb. 27, 1940 |